United States Patent
Fujinoki et al.

(10) Patent No.: US 6,296,826 B1
(45) Date of Patent: Oct. 2, 2001

(54) METHOD FOR THE PREPARATION OF VITRIFIED SILICA PARTICLES

(75) Inventors: Akira Fujinoki; Akihiko Sugama; Tohru Yokota, all of Fukushima-ken (JP)

(73) Assignee: Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 08/366,762

(22) Filed: Dec. 30, 1994

(51) Int. Cl.⁷ .............................. C03B 20/00; C01B 33/18
(52) U.S. Cl. ............................. 423/335; 65/21.1; 65/33.1
(58) Field of Search ............................. 423/335; 65/21.1, 65/33.1, 33.3; 501/33

(56) References Cited

U.S. PATENT DOCUMENTS

| | | | |
|---|---|---|---|
| 3,830,371 | * 8/1974 | Garcia | 210/265 |
| 3,925,058 | * 12/1975 | Onarheim | 423/335 |
| 4,200,445 | * 4/1980 | Bihuniak et al. | 423/337 |
| 4,810,415 | * 3/1989 | Winkelbauer et al. | 423/335 |
| 4,853,198 | * 8/1989 | Orii et al. | 423/335 |
| 5,030,433 | * 7/1991 | Mehrotra | 423/335 |
| 5,063,003 | * 11/1991 | Gonzalez-Oliver | 423/335 |
| 5,063,179 | * 11/1991 | Menashi et al. | 423/335 |

FOREIGN PATENT DOCUMENTS

| | | | | |
|---|---|---|---|---|
| 969741 | * | 6/1975 | (CA) | 423/335 |
| 58-204816 | * | 11/1983 | (JP) | 423/335 |
| 61-183112 | * | 8/1986 | (JP) | 423/335 |
| 2-34528 | * | 2/1990 | (JP) | 423/338 |
| 606812 | * | 5/1978 | (SU) | 423/335 |

* cited by examiner

*Primary Examiner*—Ngoc-Yen Nguyen
(74) *Attorney, Agent, or Firm*—Wenderoth, Lind & Ponack, L.L.P.

(57) ABSTRACT

An efficient method is proposed for the utilization of heretofore useless extremely fine fluffy silica particles obtained as a flue dust in the flame-hydrolysis of vaporizable silicon compound in an oxyhydrogen flame in the manufacturing process of fused silica glass. The method comprises the steps of (a) uniformly mixing the silica particles with water, (b) drying the wet mixture under specified conditions to give dried cakes of the silica particles, (c) disintegrating the dried cakes into porous silica beads having an appropriate particle diameter, (d) semi-sintering the porous silica beads at 800 to 1300° C. and (e) vitrifying the semi-sintered silica beads at 1350 to 1550° C. into vitrified poreless silica glass particles which can be used as a base material for the production of fused silica glass articles.

3 Claims, No Drawings

METHOD FOR THE PREPARATION OF VITRIFIED SILICA PARTICLES

BACKGROUND OF THE INVENTION

The present invention relates to a method for the preparation of vitrified silica particles. More particularly, the invention relates to a method for the preparation of vitrified silica particles suitable as a base material of transparent fused silica glass bodies from extremely fine silica particles having no usefulness as such due to fluffiness to cause difficulties in handling.

As is known, synthetic fused silica glass is prepared by several different methods including the so-called direct method, soot method and sol-gel method in a gross classification. In the so-called direct method, a vaporizable silicon compound is introduced into an oxyhydrogen flame in which the silicon compound such as silicon tetrachloride is flame-hydrolyzed and converted into fine silica particles to be deposited on a rotating substrate body to form a porous silica body which is vitrified in situ as it grows by heating with the oxyhydrogen flame. This method is widely practiced in the preparation of fused silica glass bodies useful in the manufacture of various kinds of optical parts because the fused silica glass body prepared by this method has a high purity and is free from occlusion of bubbles.

In the soot method, on the other hand, the porous silica body formed by the deposition of the silica particles, i.e. silica soot, produced from a silicon compound in an oxyhydrogen flame on the rotating substrate is, without being vitrified in situ as it grows, vitrified in a separate electric furnace into a transparent silica glass body. Because the conditions for the flame hydrolysis of a silicon compound can be moderate as compared with the direct method, the soot method is practiced in the preparation of a preform as a precursor of optical fibers which must have a modified refractive index by doping with a refractive index-modifying dopant such as germanium and the like. Further, the porous silica glass body before sintering and vitrification can be subjected to a dehydroxylation treatment or doping with fluorine and other vaporizable dopants by utilizing the porosity thereof.

The sol-gel method is a wet process in which a silicate ester such as tetraethoxy silane is subjected to a hydrolysis-condensation reaction to form a block of semi-solid sol which is then dried and sintered at a high temperature into a vitrified transparent silica glass body. A problem in this method is that formation of cracks is sometimes unavoidable in the block of the semi-solid gel so that this method is hardly applicable to the preparation of a large silica glass body. Accordingly, this method is rarely utilized in the preparation of fused silica glass articles and the only way to industrially practice this method is for the preparation of a silica filler as a compounding material of molding resins and the like by pulverizing the sintered body.

A problem common in the direct and soot methods is the low yield in the deposition of the silica particles relative to the amount of the consumed vaporizable silicon compound. Namely, the yield in the direct method is usually about 30% and the yield in the soot method also can rarely exceed 50% with a great loss of the silicon compound due to the loss of the silica particles formed therefrom but dissipated or discharged out of the oxyhydrogen flame furnace without being deposited to form the porous silica body. The silica particles recovered in a filter bag and the like as a flue dust have a very small particle diameter of 0.2 $\mu$m to several micrometers in the form of a very fluffy powder difficult to handle.

The thus recovered silica powder as such has almost no industrial usefulness due to the uncontrolled particle size distribution and possible contamination and must be discarded or disposed as an industrial waste material sometimes to cause serious environmental pollution.

As a consequence of the above mentioned problem in the prior art methods for the preparation of fused silica glass in which a half amount or even larger of the starting silicon compound is consumed futilely, the cost for the preparation of synthetic fused silica glass is increased so much even if not to mention the problem in respect of the environmental pollution. Thus, it is an important problem in the technology for the preparation of synthetic fused silica glass to establish an efficient way for the effective utilization of the extremely fine fluffy silica particles produced in the process of flame hydrolysis of a vaporizable silicon compound and heretofore discarded as an only way for the disposal thereof.

SUMMARY OF THE INVENTION

The present invention accordingly has an object to provide an efficient way for the effective utilization of extremely fine silica particles produced in the manufacturing process of synthetic fused silica glass or in the handling thereof and utilized or disposed with great difficulties due to the fluffiness and impurities contained therein. Another object of the present invention is to provide a method for the preparation of poreless vitrified silica glass particles suitable for use in the preparation of a transparent fused silica glass body starting from extremely fine silica particles produced in the manufacturing process of synthetic fused silica glass or in the handling thereof and discarded heretofore as an only way for the disposal thereof.

Thus, the method of the present invention for the preparation of poreless vitrified silica glass particles comprises the successive steps of:

(a) admixing finely divided silica particles having a specific surface area in the range from 1 $m^2/g$ to 400 $m^2/g$ or, preferably, from 10 $m^2/g$ to 400 $m^2/g$ with water to form a uniform mixture of the silica particles and water;

(b) dehydrating and drying the mixture of the silica particles and water to give a porous caked mass of the silica particles;

(c) disintegrating the porous caked mass of the silica particles to give porous silica particles;

(d) heating the porous silica particles at a temperature in the range from 800° C. to 1300° C. for a length of time in the range from 5 hours to 100 hours to give semi-sintered silica particles; and (e) heating the semi-sintered silica particles at a temperature in the range from 1350° C. to 1550° C. for a length of time of at least 10 minutes.

When purification of the product silica glass relative to the content of metallic impurities is desired, the porous silica particles obtained in the step (c) is subjected to washing or leaching with an aqueous acid solution so as to dissolve way any metallic impurities contained in the particles followed by thorough rinse with water.

When doping of the product silica glass with a dopant is desired, it is preferable to soak the porous silica particles obtained in the step (c) with a solution containing the dopant compound followed by drying before the step (d).

Further, when it is desired to decrease the content of hydroxyl groups in the product silica glass, it is preferable to conduct the heating treatment in the step (d) in an atmosphere containing chlorine gas, thionyl chloride gas or a combination thereof.

DETAILED DESCRIPTION OF THE PREFERRED EMBODIMENTS

As is described above, the inventive method basically comprises the essential steps (a) to (e) and, when these steps are undertaken adequately, the fluffy silica powder consisting of extremely finely divided silica particles recovered as a flue dust can be converted into poreless vitrified silica particles of a relatively large particle size easy to handle and suitable as a base material for the preparation of transparent fused silica glass articles.

The starting material used in step (a) of the inventive method is a fine silica powder obtained by collecting the flue dust in the manufacturing process of porous silica glass body by the direct method or soot method although silica powders from any other sources can be used provided that they have equivalent physical properties. Such a finely divided silica powder usually has a particle diameter in the range, for example, from 0.2 to 2 μm and the bulk density of the powder is very low to be only one tenth to one thirtieth of the true density of silica so that it is very fluffy and difficult to handle. The particle size of the silica powder can be defined in terms of the specific surface area which should be in the range from 1 $m^2/g$ to 400 $m^2/g$ or, desirably, from 10 $m^2/g$ to 400 $m^2/g$ to be suitable for use in the inventive method.

In step (a) of the inventive method, the above described silica powder is admixed with water to give a uniform mixture of the silica powder and water. The amount of water is not particularly limitative but usually in the range from 100 to 200 parts by weight per 100 parts by weight of the silica powder though not particularly limitative thereto. When the amount of water is too small, no uniform mixture of the silica powder and water can be obtained leaving a substantial amount of unwetted silica particles. When the amount of water is too large, on the other hand, an economical disadvantage is caused because a large amount of water must be removed in the successive step (b) with consumption of a large quantity of thermal energy taking a long time. It is not always necessary that the mixture of the silica powder and water has a consistency of a slurry having flowability. The amount of water up to a certain limit also has an influence on the hardness or fragility of the dried porous caked mass of silica particles to be obtained in the subsequent step (b).

In step (b) of the inventive method, the above obtained uniform mixture of the silica powder and water in the form of a wet cake is dehydrated and dried to give a dried and caked porous mass of silica particles. When the uniform mixture of the silica particles and water contains a large amount of water to give a consistency of a flowable slurry, it is preferable that the mixture or slurry is subjected, prior to drying, to a partial dehydration treatment but a conventional procedure of filtration is hardly applicable in this case because the mesh openings of the filter cloth are readily clogged by the fine silica particles even by conducting the filtration under pressurization with a pressure of 5 kgf/$cm^2$ or even higher. Acccordingly, the mixture is subjected to the drying treatment without undertaking any mechanical dehydration treatment such as filtration. In this regard also, the amount of water should not be too large relative to the amount of the silica particles.

The temperature for the drying treatment of the wet cake of a uniform mixture of the silica powder and water is not particularly limitative but preferably at or around 100° C. or in the range of about 80° C. to 100° C. in order to obtain an adequately rapid drying velocity suitable as an industrial process. If necessary, the wet cake of the mixture of the silica particles and water is divided into smaller portions or is spread over a tray in order to accelerate drying. It is noted that the hardness or fragility of the thus obtained porous dried cake of silica particles depends on the amount of water and on the drying velocity, which can be controlled by suitably selecting the drying temperature, and the hardness is increased as the amount of water is increased or the drying velocity is decreased.

In step (c) of the inventive method, the dried and caked porous mass of silica particles obtained in step (b) is subjected to disintegration into a relatively coarse porous particles or beads of silica having a particle diameter of, for example, 10 μm to 1 mm. The machine used for this disintegration of the porous cake can be any of conventional pulverization machines of which ball mills are preferred from the standpoint of practice. The balls with which the ball mill is charged are preferably those of polyethylene or Teflon resin because conventional alumina balls necessarily cause heavy contamination of the silica beads with the alumina as an impurity which can hardly be removed subsequently. Balls of fused silica glass are the most preferable. It is of course that the material of the balls is selected in consideration of the hardness of the dried porous cake of the silica particles.

Though not essential, the porous silica particles or beads obtained by disintegration of the dried cake are subjected to particle size classification by a suitable means including screening in order to remove any too fine or too coarse particles to collect the fractions having a particle diameter in the above mentioned range of 10 μm to 1 mm or, more preferably, 100 μm to 700 μm or in a still narrower range in consideration of the various optional treatments to be undertaken with the disintegrated porous particles described later. The screens or sieves used for the particle size classification should be those made from filaments of an organic synthetic resin such as nylons. Screens of a metallic wire net are undesirable due to possible contamination of the silica particles with the metal. Trommels can be used advantageously because the procedures of pulverization and provisional screening to remove too coarse particles can be performed at one time in the machine of this type to simplify the subsequent screening process. It is usual that the porous silica particles or beads obtained by conducting step (c) have a somewhat decreased specific surface area as compared with that of the starting extremely fine silica particles but the decrease in the specific surface area through the steps of (a), (b) and (c) is relatively small or, for example, 20 to 30% so that a porous silica particles or beads having a specific surface area of 20 to 50 $m^2/g$ can be easily obtained by using an appropriate starting silica powder.

The porous silica particles obtained in step (c) by the disintegration of the porous caked mass of silica particles are then subjected to a first heat treatment in step (d) to give semi-sintered silica particles. This heat treatment is usually performed in an electric furnace at a temperature in the range from 800 to 1300° C. for a length of time in the range from 5 to 100 hours. The type of the electric furnace is not particularly limitative but horizontal tubular furnaces having a furnace tube are usually preferable in respect of the efficiency and convenience for the heat treatment which sometimes must be conducted in an atmosphere of a specific gas although the heat treatment is basically conducted in an atmosphere of air. It is preferable that this first heat treatment of the porous silica particles is performed to such an extent that the thus obtained semi-sintered silica particles have a bulk density in the range from 0.6 to 0.9 g/$cm^3$, though not particularly limitative thereto.

The semi-sintered silica particles obtained in step (d) above are then subjected in step (e) to a second heat treatment at a higher temperature so that the particles are converted into poreless vitrified silica particles. The temperature for this second heat treatment is in the range from 1350 to 1550° C. or, preferably, in the range from 1450 to 1500° C. When the temperature is too low, the vitrification of the silica particles does not proceed at a sufficiently high velocity as a matter of course while, when the temperature is too high, coalescence of silica particles may eventually be caused due to partial melt bonding of particles. This vitrification heat treatment can be in an atmosphere of air but should preferably be performed in vacuum since any volatile materials and air bubbles in the particles can be removed by heating under vacuum. This vitrification heat treatment of the silica particles should be performed for at least 10 minutes and up to 30 minutes. Vitrification of the silica particles is complete usually within 1 hour although any longer time has no particular adverse influences on the properties of the vitrified silica particles.

This second heat treatment can be performed in the same electric furnace as used in the first heat treatment but, when a furnace tube of fused silica glass is used in a horizontal tubular furnace in the first heat treatment, the furnace tube cannot withstand the temperature of this second heat treatment so that use of a muffle furnace is recommended both in the first and second heat treatments when these two-step treatments are to be undertaken consecutively.

The vitrified poreless silica glass particles obtained in step (e) described above can be used as such as a base material for the preparation of fused silica glass articles. If necessary, these poreless silica glass particles can be again subjected to pulverization or particle size classification by using a ball mill of fused silica glass or screen of Teflon net in order to avoid contamination although the particles after such optional treatments can be washed with an acid to remove metallic impurities.

When the starting fine silica particles are contaminated with metallic impurities which have an adverse influence on the usefulness of the finally obtained fused silica glass articles, it is recommendable that the porous silica particles obtained in step (c) are subjected, prior to step (d), to a washing treatment with an acid which is preferably an inorganic acid such as hydrochloric, sulfuric and nitric acids having a purity as high as possible relative to metallic impurities. For example, hydrochloric acid of 12N concentration can be used satisfactorily. Thus, the acid solution is added to a vessel containing the porous silica particles in such a volume that the bed of the particles can be fully covered by a layer of the acid solution and heated at a temperature in the range from 60 to 80° C. under gentle agitation for a length of time of at least 20 minutes. It should be noted that the agitation of the blend should not be too vigorous in order to avoid comminution of the particles. In this regard, it is sometimes advantageous that the blend in the vessel is agitated, instead of the use of a mechanical stirrer, by bubbling air thereinto to cause swirling of the silica particles. The acid-washed silica particles are then thoroughly rinsed with deionized water until the washing or filtrate indicates neutrality followed by drying, for example, by heating at about 80 to 100° C. in a conventional drying oven.

It is sometimes desirable that the content of hydroxyl groups in the final fused silica glass articles is reduced so as to be imparted with improved heat resistance. When such is the case, the semi-sintering treatment of the porous silica particles in step (d) is performed in an atmosphere of a gas having a dehydroxylating activity such as chlorine, thionyl chloride and the like as well as mixtures thereof. Further, when doping of the fused silica glass with a certain dopant, e.g., neodymium, is desired, the porous particles obtained in step (c) are subjected, prior to step (d), to the so-called "stuffing" treatment with the dopant. For example, the porous particles are dipped in an aqueous solution of neodymium chloride to be soaked therewith followed by drying to give particles stuffed with the dopant which are then subjected to the two-step heat treatments in steps (d) and (e) to give poreless but doped vitrified silica glass particles.

In the following, the method of the present invention is described in more detail by way of examples.

EXAMPLE 1

A porous "soot" body of silica was prepared by the flame hydrolysis method in which silicon tetrachloride after purification by distillation was introduced into an oxyhydrogen flame and the fine silica particles formed by the flame hydrolysis were deposited on a rotating substrate while a substantial amount of the silica particles were not deposited but discharged through the flue to be collected in a bag filter. The thus collected silica particles had a particle diameter in the range from 0.1 to 3 $\mu$m and the specific surface area thereof as determined by the BET method was about 50 $m^2/g$ so that the powder was very fluffy to be handled with great difficulties.

One kg of the silica particles was admixed with 1.5 kg of deionized water and thoroughly blended together to give a uniform mixture of the silica particles and water having a high consistency but retaining flowability. The mixture was spread over a tray and dried by heating for 24 hours at 80° C. to give porous dried cakes of silica particles, which were disintegrated and subjected to disintegration and provisional particle size classification in a trommel rotating at 50 rpm, which was charged with fused silica glass beads and provided with screens spaced with a gap of about 1 mm. The porous silica particles discharged out of the trommel were further screened to collect the fraction passing through a screen of 700 $\mu$m mesh openings but retained on a screen of 100 $\mu$m mesh openings. The amount of the thus collected porous silica particles was about 600 g and the specific surface area thereof was 35 $m^2/g$ as determined by the BET method.

The thus screened porous silica particles were added to 5 liters of 12N concentrated hydrochloric acid and the blend was heated at 60° C. for 30 minutes under gentle agitation to perform acid washing of the particles. The acid-washed silica particles were rinsed two times by decantation each time with 10 liters of deionized water followed by removal of free water. This cycle of acid-washing and rinse was repeated three times and finalized by an additional rinse with water. The thus purified silica particles were spread over a tray and dried by heating at 80° C. for 24 hours to give purified and dried porous silica particles.

The dried porous silica particles after purification were introduced into a vessel of fused silica glass and subjected to the first heat treatment in a horizontal tubular furnace at a temperature of 1200° C. for 15 hours under a stream of nitrogen gas to give semi-sintered silica particles of which the specific surface area was 10 $m^2/g$ or smaller as determined by the BET method. The thus semi-sintered silica particles were introduced into a crucible of fused silica glass and subjected to the second heat treatment for vitrification by heating at 1500° C. for 5 hours under atmospheric air in a muffle furnace to give vitrified transparent silica glass particles. Optical microscopic examination of the thus obtained silica glass particles indicated that the particles were clear and transparent without containing bubbles. The silica glass particles were further subjected to test melting in a Verneuil's furnace to give a transparent fused silica glass body without troubles due to foaming.

Following are the results of the analysis by the atomic absorption spectrophotometry for the contents of metallic impurities in ppm by weight in the starting fine silica dust and the vitrified silica glass particles.

|  | Li | Ca | Mg | Al | Fe | Cu | K | Na |
|---|---|---|---|---|---|---|---|---|
| Starting silica dust | 0.1 | 0.3 | 0.5 | <5 | 130 | 0.3 | <0.05 | 0.3 |
| Vitrified particles | <0.1 | <0.2 | 0.1 | <5 | 0.3 | <0.05 | <0.05 | 0.2 |

EXAMPLE 2

An aqueous slurry was formed by the addition of water to fine silica particles having a specific surface area of 3 $m^2/g$ as prepared by the so-called sol-gel method in which tetraethoxy silane was hydrolyzed in a mixture of water and ethyl alcohol in the presence of ammonia as the catalyst. The aqueous slurry was, after being partly dehydrated by centrifugation, spread over a tray and dried by heating at 80° C. for 24 hours to give dried cakes of silica particles, which were disintegrated and subjected to particle size classification in the same manner as in Example 1 but without the acid washing treatment to give porous silica particles having such a particle size distribution as to pass a screen of 700 μm mesh openings but to be retained on a screen of 100 μm mesh openings, of which the specific surface area was 2 $m^2/g$.

The thus prepared porous silica particles were subjected to the two-step heat treatments in the same manner as in Example 1 to give transparent fused silica glass particles having an average particle diameter of about 400 μm. The specific surface area of the semi-sintered silica particles after the first-step heat treatment was 1 $m^2/g$ or smaller.

Following are the results of the analysis for the contents of metallic impurities in ppm by weight in the thus obtained vitrified silica glass particles.

| Li | Ca | Mg | Al | Fe | Cu | K | Na |
|---|---|---|---|---|---|---|---|
| <0.1 | <0.2 | <0.1 | <5 | <0.1 | <0.05 | <0.05 | <0.1 |

EXAMPLE 3

An aqueous slurry was prepared by uniformly mixing 1 kg of a commercially available fumed silica filler having a specific surfaced area of 200 $m^2/g$ with 1.5 kg of water. The aqueous slurry was spread over a tray and dried by heating at 80° C. for seven days to give dried cakes of silica particles, which were disintegrated and subjected to particle size classification in the same manner as in Example 1 but without the acid washing treatment to give porous silica particles having a specific surface area of 60 $m^2/g$.

The thus prepared porous silica particles were subjected to the two-step heat treatments in the same manner as in Example 1 to give transparent fused silica glass particles. The specific surface area of the semi-sintered silica particles after the first-step heat treatment was 10 $m^2/g$ or smaller.

Following are the results of the analysis for the contents of metallic impurities in ppm by weight in the thus obtained vitrified silica glass particles.

| Li | Ca | Mg | Al | Fe | Cu | K | Na |
|---|---|---|---|---|---|---|---|
| <0.1 | 0.2 | <0.1 | <5 | 0.5 | 0.05 | 0.2 | 0.2 |

EXAMPLE 4

Porous silica particles were prepared in just the same manner as in Example 1. After the acid washing treatment and rinse performed in the same manner as in Example 1, the wet silica particles were soaked with an aqueous solution of aluminum chloride in a concentration of 50 ppm by weight as aluminum. After keeping the silica particles for 20 minutes in the aluminum chloride solution, the extraneous volume of the solution was discarded by decantation followed by twice of rinse with water and the wet porous silica particles were spread over a tray and dried by heating at 80° C. for 24 hours.

The thus prepared porous silica particles were subjected to the two-step heat treatments in the same manner as in Example 1 to give transparent fused silica glass particles having an average particle diameter of about 300 μm.

Following are the results of the analysis for the contents of metallic impurities in ppm by weight in the thus obtained vitrified silica glass particles.

| Li | Ca | Mg | Al | Fe | Cu | K | Na |
|---|---|---|---|---|---|---|---|
| 0.1 | 0.2 | 0.1 | 12 | 0.5 | 0.05 | 0.2 | 0.3 |

EXAMPLE 5

The experimental procedure to give vitrified silica glass particles having an average particle diameter of about 300 μm was just the same as in Example 1 except that the first-step heat treatment of the porous silica particles was conducted at 1200° C. for 2 hours under a stream of a gaseous mixture of hydrogen chloride and chlorine at flow rates of 2 liters/minute and 0.5 liter/minute, respectively.

Following are the results of the analysis for the contents of metallic impurities in ppm by weight in the thus obtained vitrified silica glass particles, of which the content of hydroxyl groups was about 10 to 50 ppm by weight.

| Li | Ca | Mg | Al | Fe | Cu | K | Na |
|---|---|---|---|---|---|---|---|
| <0.1 | <0.2 | <0.1 | <0.5 | 0.1 | <0.05 | <0.05 | <0.1 |

What is claimed is:
1. A method for the preparation of poreless vitrified silica glass particles which comprises the successive steps of:
   (a) admixing finely divided silica particles having a specific surface area in the range from 1 $m^2/g$ to 400 $m^2/g$ with water to form a uniform mixture of the silica particles and water, wherein the amount of water is in the range from 100 to 200 parts by weight per 100 parts by weight of the silica particles;
   (b) dehydrating and drying the mixture of the silica particles and water to give a porous caked mass of the silica particles;

(c) disintegrating the porous caked mass of the silica particles to give porous silica particles;

(d) heating the porous silica particles at a temperature in the range from 800° C. to 1300° C. for a length of time in the range from 5 hours to 100 hours in an atmosphere of chlorine or thionyl chloride to give semi-sintered silica particles having a bulk density in the range from 0.6 to 0.9 g/cm$^3$; and (e) heating the semi-sintered silica particles at a temperature in the range from 1450° C. to 1550° C. for a length of time of at least 10 minutes.

2. The method for the preparation of poreless vitrified silica glass particles as claimed in claim 1 in which the temperature in step (b) for drying the mixture of the silica particles and water is in the range from 80° C. to 100° C.

3. The method for the preparation of poreless vitrified silica glass particles as claimed in claim 1 in which the porous caked mass is disintegrated in step (c) to have a particle size in the range from 10 μm to 1 mm.

* * * * *